(12) United States Patent
Motokawa et al.

(10) Patent No.: US 10,347,886 B2
(45) Date of Patent: Jul. 9, 2019

(54) BATTERY MODULE AND BATTERY PACK

(71) Applicant: Panasonic Intellectual Property Management Co., Ltd., Osaka (JP)

(72) Inventors: Shinya Motokawa, Osaka (JP); Daisuke Kishii, Osaka (JP); Nobuyuki Nakasawa, Osaka (JP); Keisuke Shimizu, Osaka (JP); Akira Takano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 15/314,582

(22) PCT Filed: Aug. 21, 2015

(86) PCT No.: PCT/JP2015/004195
§ 371 (c)(1),
(2) Date: Nov. 29, 2016

(87) PCT Pub. No.: WO2016/031208
PCT Pub. Date: Mar. 3, 2016

(65) Prior Publication Data
US 2017/0200926 A1 Jul. 13, 2017

(30) Foreign Application Priority Data

Aug. 27, 2014 (JP) ................................. 2014-172293
Dec. 19, 2014 (JP) ................................. 2014-257295

(51) Int. Cl.
*H01M 2/10* (2006.01)
*H01M 2/12* (2006.01)
*H01M 2/20* (2006.01)
*H01M 10/42* (2006.01)

(52) U.S. Cl.
CPC ....... *H01M 2/1077* (2013.01); *H01M 2/1083* (2013.01); *H01M 2/1252* (2013.01); *H01M 2/206* (2013.01); *H01M 10/425* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

2012/0231309 A1* 9/2012 Itoi ..................... H01M 2/1077
429/99

FOREIGN PATENT DOCUMENTS

JP 2007-234369 9/2007

OTHER PUBLICATIONS

International Search Report of PCT application No. PCT/JP2015/004195 dated Oct. 27, 2015.

* cited by examiner

*Primary Examiner* — Wyatt P McConnell
(74) *Attorney, Agent, or Firm* — McDermott Will & Emery LLP

(57) ABSTRACT

A battery module includes a plurality of battery blocks. Each battery block includes: a cell assembly including a plurality of cells; a block holder for holding the cell assembly; and a metal plate. The plurality of cells are held in the block holder while the positive electrodes and negative electrodes of the cells are aligned. A projection or the metal plate is disposed outside the block holder. The tip of the projection of one of adjacent battery blocks is in contact with the metal plate of the other.

9 Claims, 34 Drawing Sheets

BATTERY MODULE AND BATTERY PACK

TECHNICAL FIELD

The present invention relates to a battery module and a battery pack.

BACKGROUND ART

As a power source for driving a motor of an electric car or the like, or as a power source for household use or industrial use, a battery module formed in the following manner is employed. A battery block is formed by interconnecting cells such as lithium-ion cells in parallel, and a battery module is formed by interconnecting a plurality of battery blocks in series or in parallel.

CITATION LIST

Patent Literature

PTL 1 Unexamined Japanese Patent Publication No. 2007-234369

SUMMARY OF THE INVENTION

When a plurality of cells are mounted in a car or the like, the safety of a battery module must be secured. The present invention provides a battery module and battery pack having a high safety.

A battery module of the present invention includes a plurality of battery blocks. Each of the plurality of battery blocks includes: a cell assembly including a plurality of cells; a block holder for holding the cell assembly; and a metal plate. A plurality of cells are held in a block holder while the positive electrodes of the cells are aligned to one side and the negative electrodes of the cells are aligned to the other side. The metal plate is disposed outside the block holder and on one of the positive electrode side and negative electrode side of the cells. The block holder includes, on the other electrode side of the cells, a projection projecting toward the outside of the block holder. The plurality of battery blocks are disposed so as to be adjacent to each other. The projection of one of battery blocks adjacent to each other is disposed so as to face the metal plate of the other battery block. The tip of the projection of one battery block is in contact with the metal plate of the other battery block.

The present invention can provide a battery module and battery pack of a high safety.

DESCRIPTION OF EMBODIMENT(S)

Hereinafter, an example of an exemplary embodiment is specifically described with reference to the accompanying drawings. In referred drawings, the same component is denoted with the same reference mark. In principle, duplicate description of the same component is omitted.

Figure 1:
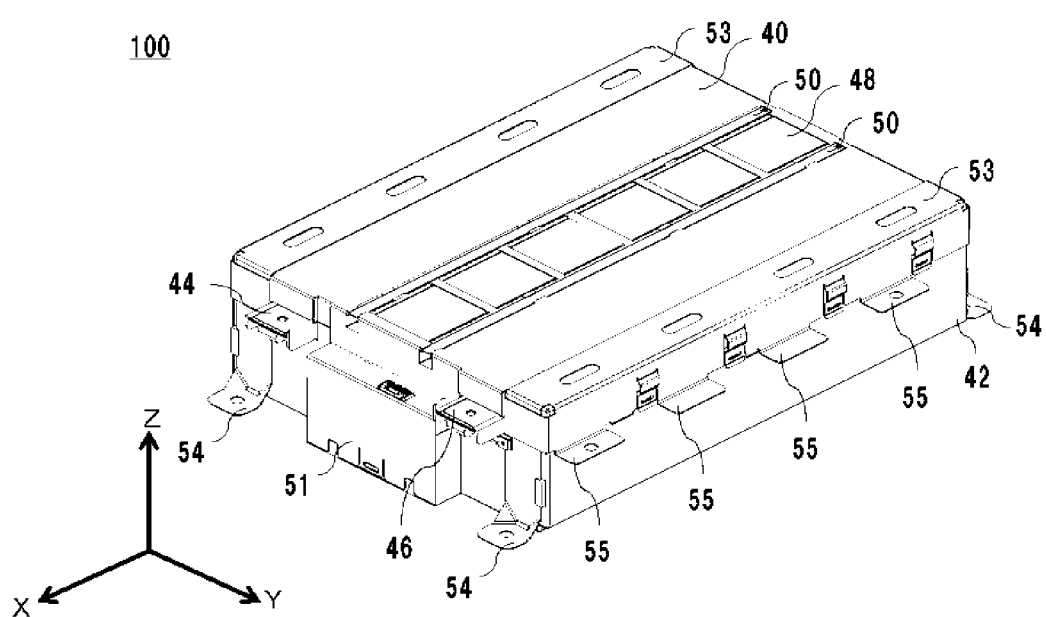
FIG. 1 is a perspective view of the appearance of a battery module.
Figure 2:
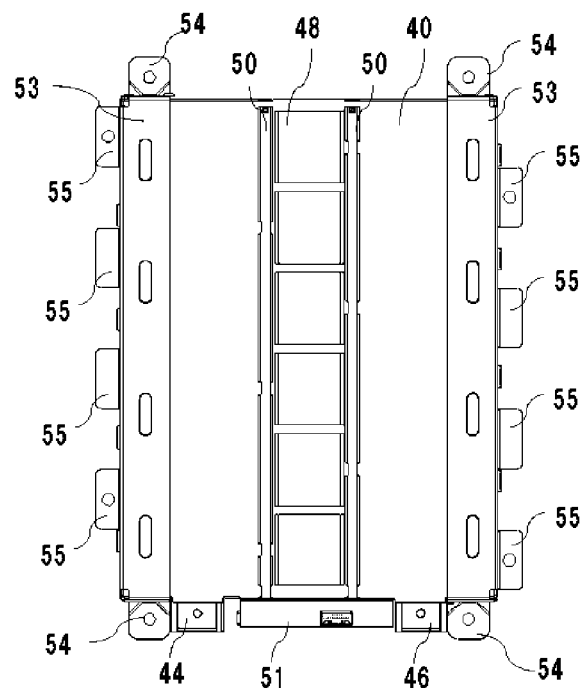
FIG. 2 is a plan view from the Z direction of the battery module.
Figure 3:
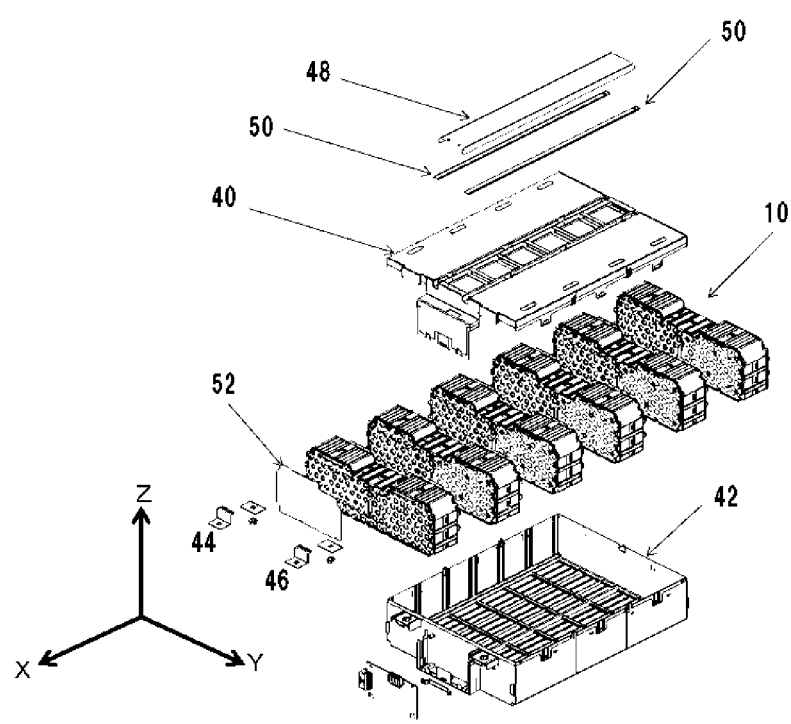
FIG. 3 is an exploded perspective view of the battery module.
Figure 4:
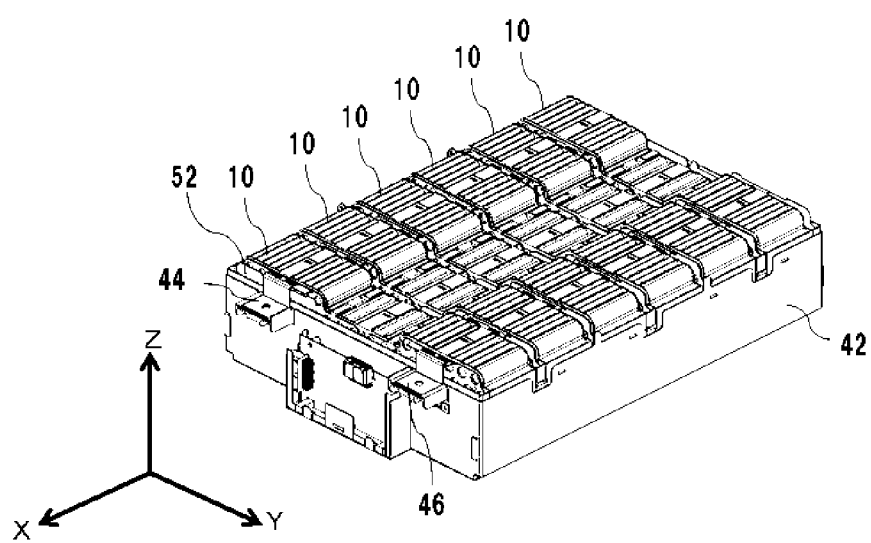
FIG. 4 is a perspective view showing the state where a plurality of battery blocks are stored in a lower case.
Figure 5:
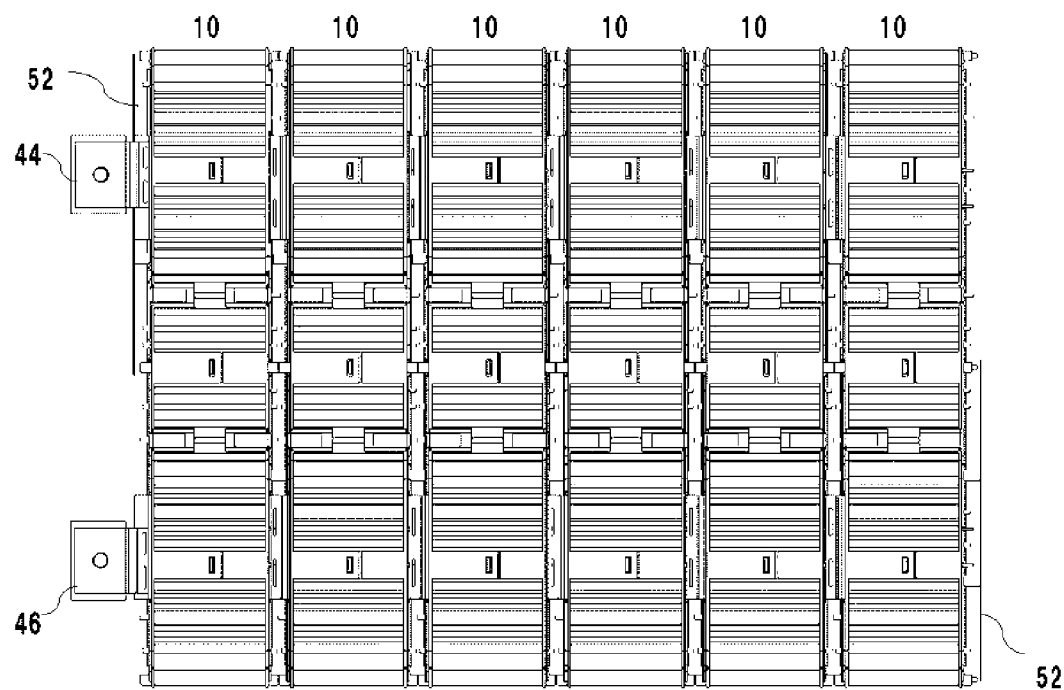
FIG. 5 is a plan view from the Z direction of the plurality of battery blocks stored in the lower case.

FIG. 1 is a perspective view of the appearance of battery module 100. FIG. 1 defines the X direction, Y direction, and Z direction. The direction of the arrow, which indicates a direction, is a plus direction, and the opposite direction to the arrow is a minus direction. In the following sentences, the X direction means the plus X direction, the Y direction means the plus Y direction, and the Z direction means the plus Z direction. FIG. 2 is a plan view from the Z direction of battery module 100. FIG. 3 is an exploded perspective view of battery module 100. FIG. 4 is a perspective view showing the state where a plurality of battery blocks 10 are stored in lower case 42. FIG. 5 is a plan view from the Z direction of the plurality of battery blocks 10 stored in lower case 42.

Battery module 100 includes a plurality of battery blocks 10. In battery module 100, the plurality of battery blocks 10 are stored in upper case 40 and lower case 42. A battery case is formed of upper case 40 and lower case 42. On the side surface of the battery case viewed from the X direction, positive electrode terminal 44 and negative electrode terminal 46 project from the inside of the battery case. Positive electrode terminal 44 is connected to positive electrode terminals of the battery blocks, and negative electrode terminal 46 is connected to negative electrode terminals of the battery blocks. In other words, positive electrode terminal 44 is electrically connected to the positive electrodes of a plurality of cells included in the battery module, and negative electrode terminal 46 is electrically connected to the negative electrodes of the plurality of cells included in the battery module. Upper case 40 includes exhaust duct 48. Exhaust duct 48 is a route used for exhausting gas out of the battery case when the gas ejects from cells 1 constituting a battery block. The ejection of the gas from cells 1 means that the gas generated in exterior cans of cells 1 ejects out of the exterior cans. Each harness holder 50 is a space in which a signal line is disposed. When high-temperature gas is released from cells 1, first metal plate 52 is used for reducing the influence of the gas on lower case 42. Even when the gas is released from cells 1, first metal plate 52 prevents the pressure or heat of the gas from causing a hole in lower case 42, and prevents the breakage of an electronic control unit (ECU) held by ECU holding unit 51. Bracket 53 is a member to be fixed to a car. Bracket 53 includes first projecting portions 54 and second projecting portions 55.

Figure 6:
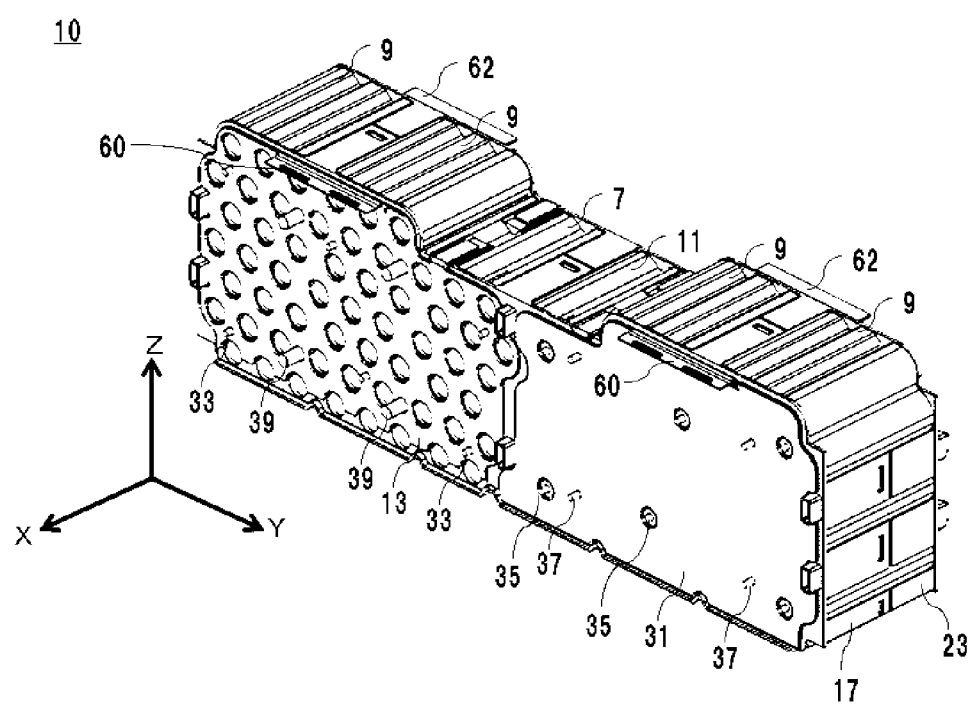
FIG. 6 is a perspective view showing the appearance of a battery block.
Figure 7:
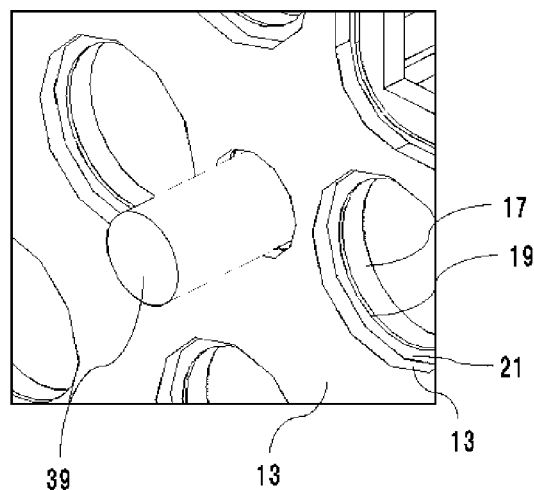
FIG. 7 is a partially enlarged view of the battery block.
Figure 8:
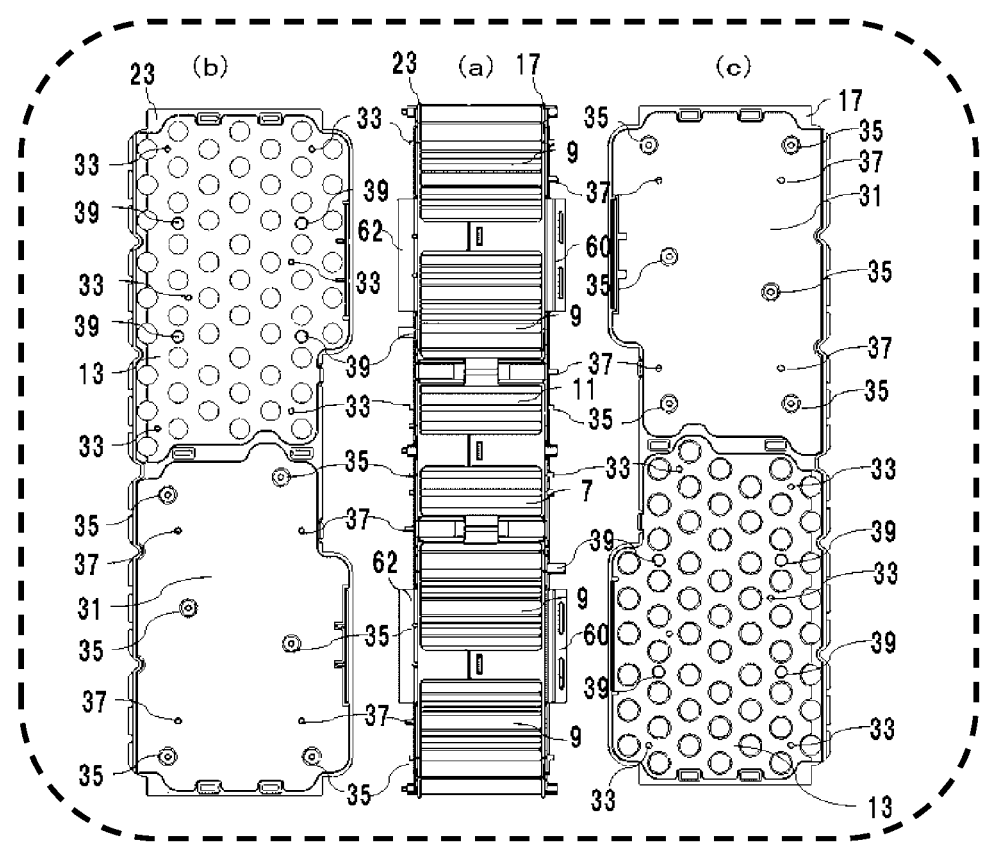
FIG. 8 is a figure of the battery block, the section (a) of FIG. 8 is a plan view from the Z direction of the battery block, the section (b) of FIG. 8 is a plan view from the X direction of the battery block, and the section (c) of FIG. 8 is a plan view from the minus X direction of the battery block.
Figure 9:
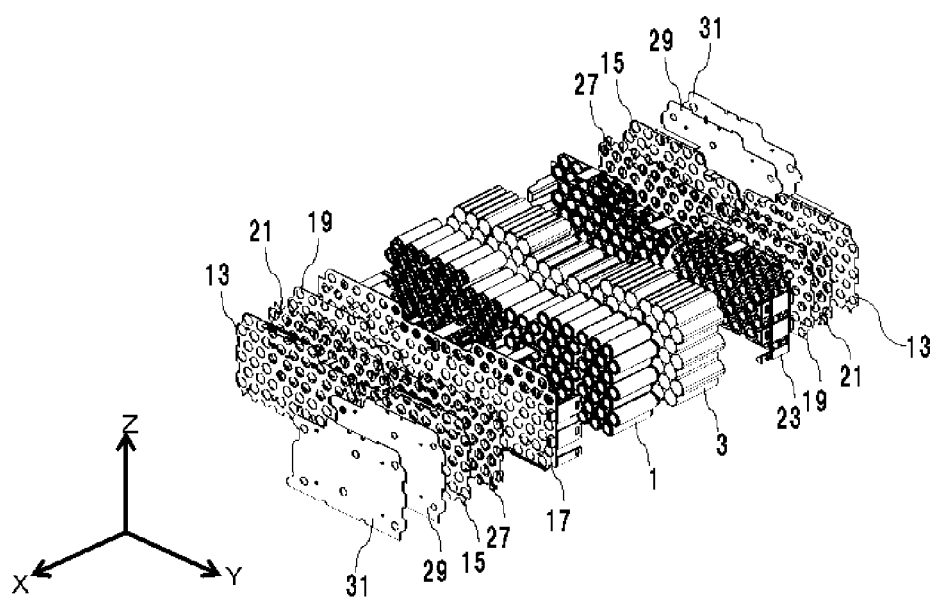
FIG. 9 is an exploded perspective view of the battery block.
Figure 10:
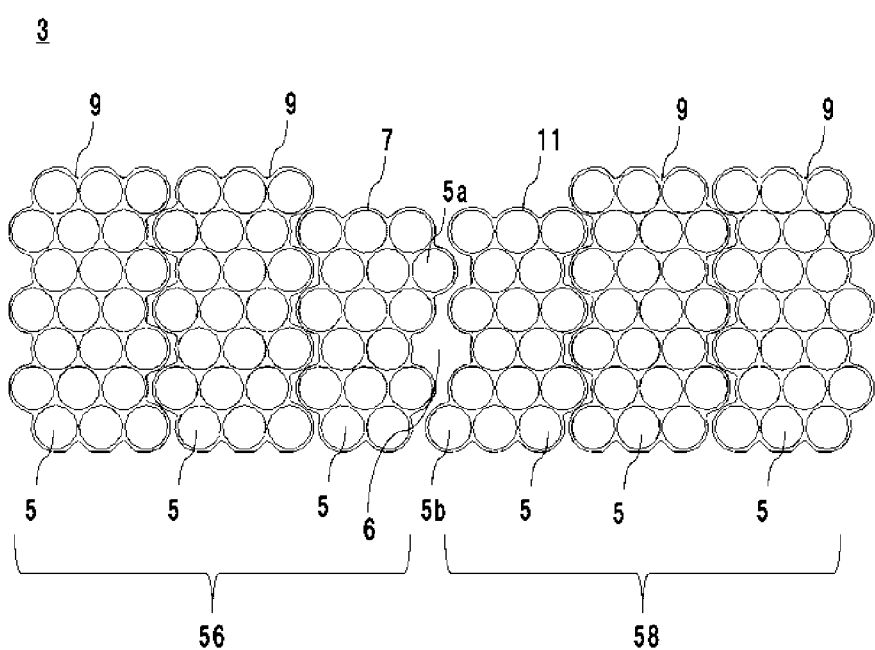
FIG. 10 is a plan view from the X direction of a battery holder.
Figure 11:
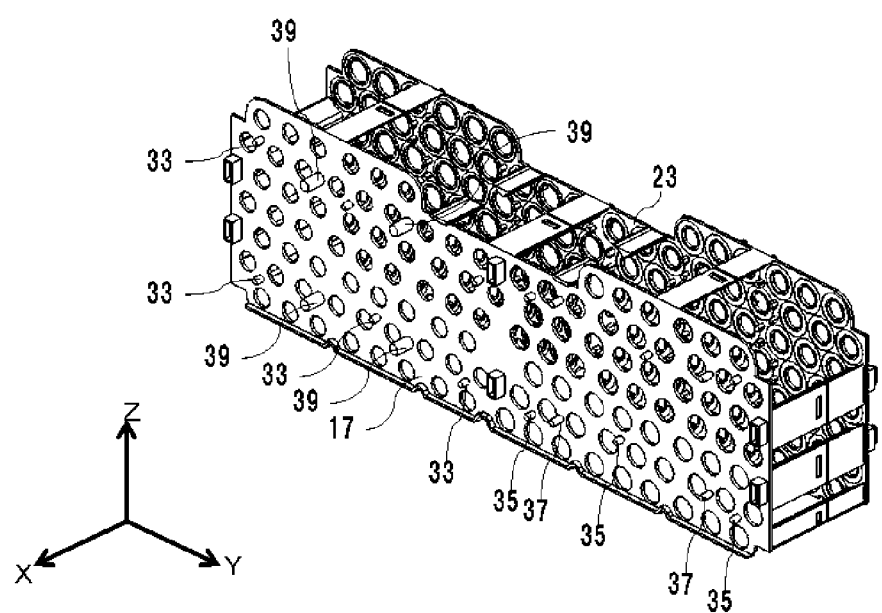
FIG. 11 is a perspective view of a block holder.
Figure 12:
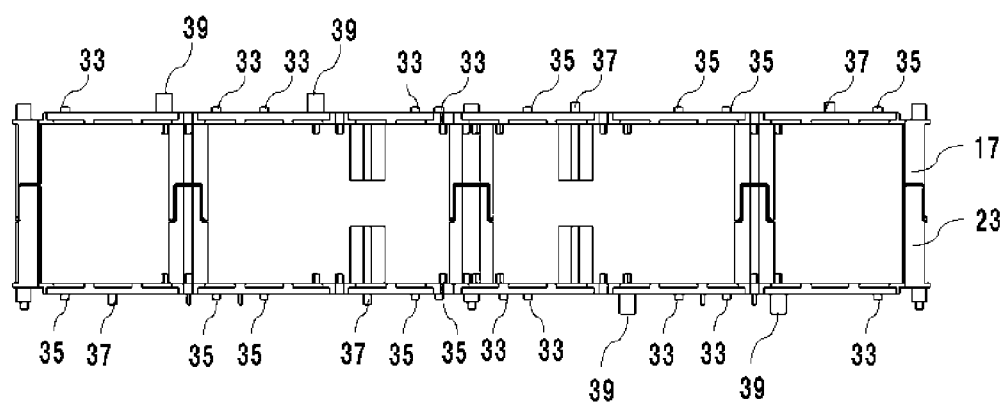
FIG. 12 is a plan view from the Z direction of the block holder.
Figure 13:
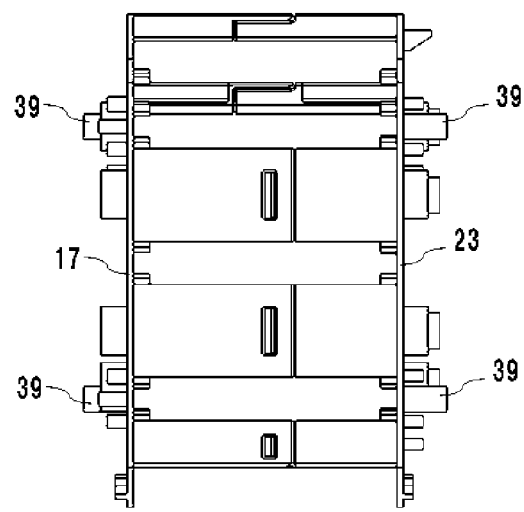
FIG. 13 is a plan view from the Y direction of the block holder.
Figure 14:
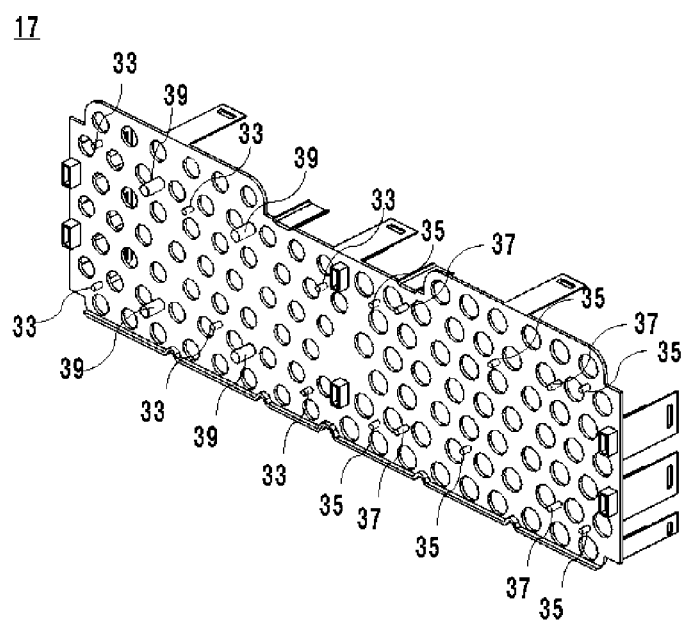
FIG. 14 is a perspective view from the X direction of a first block holder.
Figure 15:
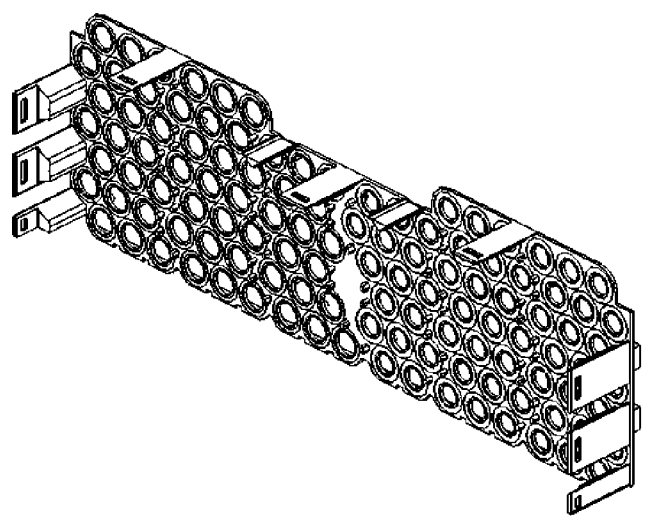
FIG. 15 is a perspective view from the minus X direction of the first block holder.
Figure 16:
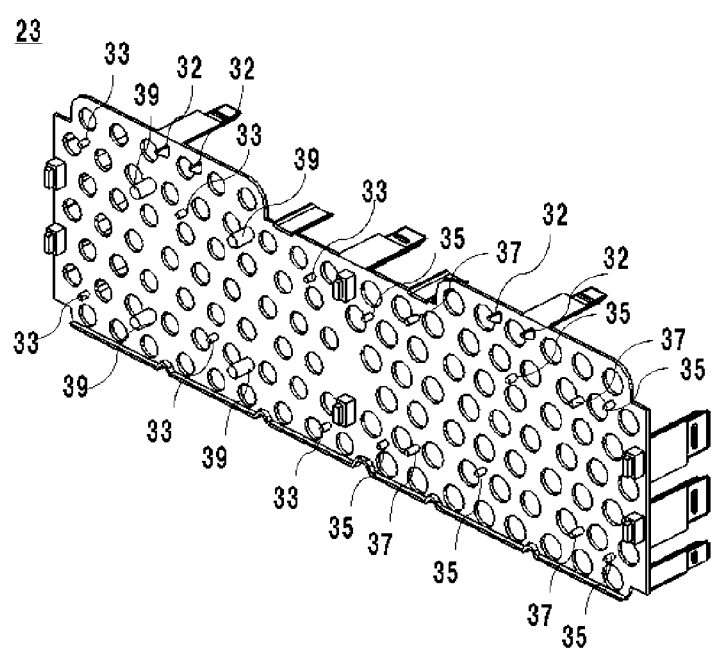
FIG. 16 is a perspective view from the minus X direction of a second block holder.
Figure 17:
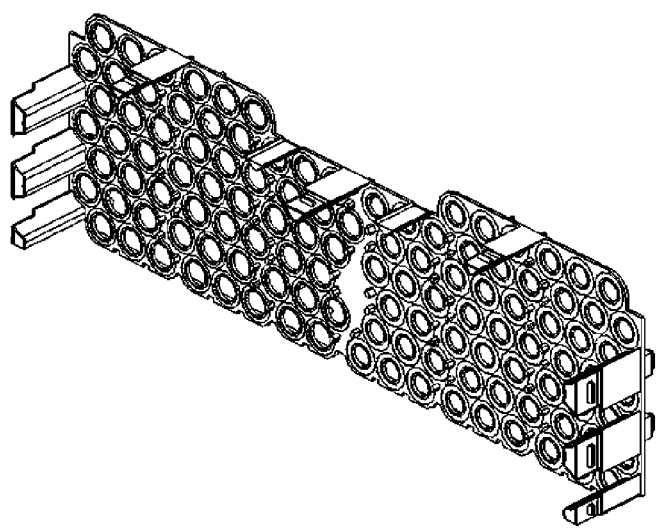
FIG. 17 is a perspective view from the X direction of the second block holder.
Figure 18:
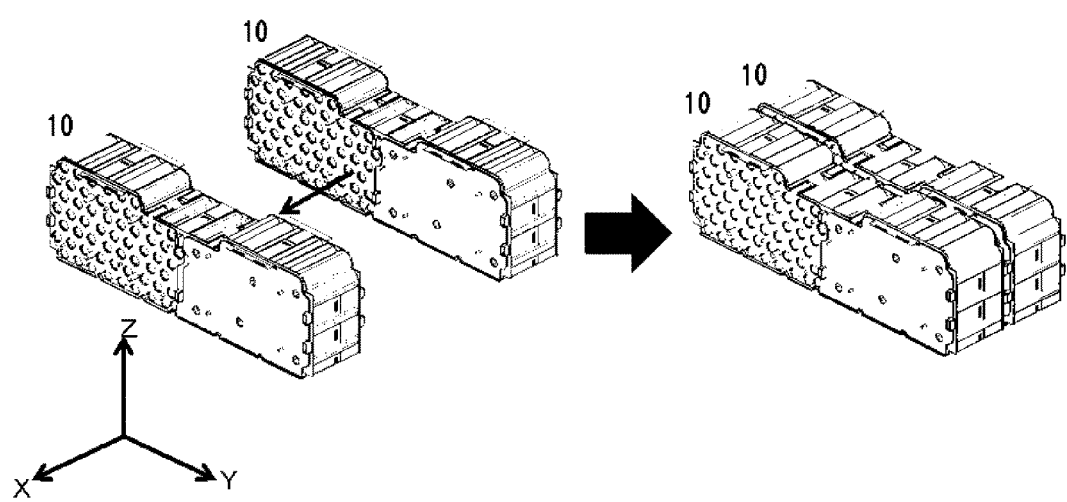
FIG. 18 is a perspective view showing the concept of modularizing the battery blocks.
Figure 19:
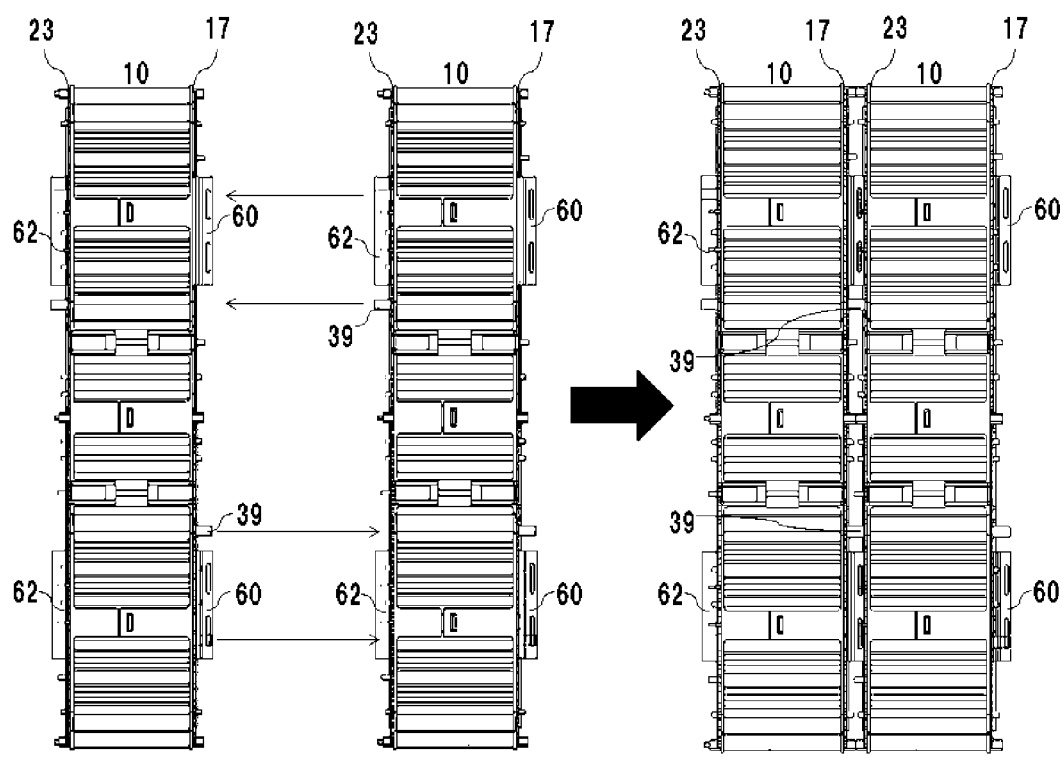
FIG. 19 is a plan view from the Z direction showing the concept of modularizing two battery blocks.
Figure 20:
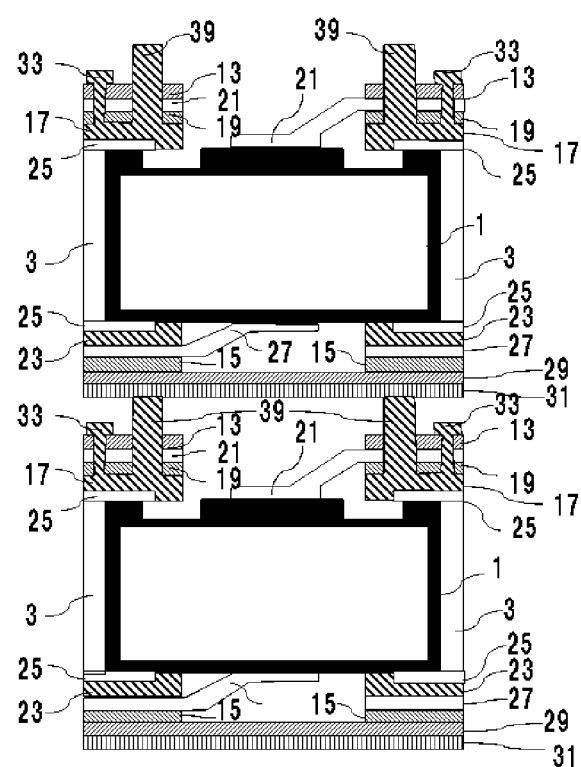
FIG. 20 is a conceptual diagram.

FIG. 6 is a perspective view showing the appearance of battery block 10. FIG. 7 is an enlarged view of fourth projection (boss) 39 of battery block 10. The section (a) of FIG. 8 is a plan view from the Z direction of battery block 10. The section (b) of FIG. 8 is a plan view from the X direction of battery block 10. The section (c) of FIG. 8 is a plan view from the minus X direction of battery block 10. FIG. 9 is an exploded perspective view of battery block 10. FIG. 10 is a plan view from the X direction of battery holder 3. FIG. 11 is a perspective view of a block holder. FIG. 12 is a plan view from the Z direction of the block holder. FIG. 13 is a plan view from the Y direction of the block holder. FIG. 14 is a perspective view from the X direction of first block holder 17. FIG. 15 is a perspective view from the minus X direction of first block holder 17. FIG. 16 is a perspective view from the minus X direction of a second block holder. FIG. 17 is a perspective view from the X direction of a second block holder. FIG. 18 is a perspective view showing the concept of modularizing two battery blocks. FIG. 19 is a plan view from the Z direction showing the concept of modularizing two battery blocks. FIG. 20 shows an image in which fourth projections 39 press the bottom side of cells 1 in the other battery block.

Battery block 10 includes a plurality of cells 1. The plurality of cells 1 are stored in battery holder 3.

Cell 1 is a chargeable/dischargeable secondary cell. As the secondary cell, a cylindrical lithium-ion cell is employed. In addition to this cell, a nickel-metal-hydride cell, an alkaline cell, and a sodium cell may be employed.

Cell 1 includes a mechanism for releasing the gas generated in the exterior can. For example, an exhaust port for releasing the gas is disposed in a positive electrode terminal One battery holder 3 includes six split holders shown in FIG. 10. One battery holder 3 includes three types of split holders having different shapes. The three types of split holders are called first split holder 7, second split holder 9, and third split holder 11. Battery holder 3 includes a plurality of through holes 5 for storing a plurality of cells 1. The plurality of through holes 5 are arranged in a staggered format (zigzag pattern). Battery holder 3 is made of a material of a high thermal conductivity. The battery holder is mainly made of aluminum, and can be molded by extrusion molding. First split holder 7 includes through hole 5a. Third split holder 11 includes through hole 5b. Through hole 5a projects to the third split holder 11 side more than other through holes 5 of first split holder 7 do. Through hole 5b projects to the first split holder 7 side more than other through holes 5 of third split holder 11 do.

First cell assembly 56 is formed of one first split holder 7 and two second split holders 9. Cells 1 stored in first cell assembly 56 are electrically interconnected in parallel. Second cell assembly 58 is formed of one third split holder 11 and two second split holders 9. Cells 1 stored in second cell assembly 58 are electrically interconnected in parallel.

The plurality of cells 1 are arranged in a staggered format in each cell assembly. In each cell assembly, the positive electrodes of cells 1 are aligned to one side and the negative electrodes of cells 1 are aligned to the other side. Cells 1 included in first cell assembly 56 and cells 1 included in second cell assembly 58 are held in battery block 10 so that the positional relationship between the positive electrodes and the negative electrodes in first cell assembly 56 is reverse to that in second cell assembly 58. A positive-electrode current collector disposed in first cell assembly 56 and a negative-electrode current collector disposed in second cell assembly 58 are arranged on the same plane. A negative-electrode current collector disposed in first cell assembly 56 and a positive-electrode current collector disposed in second cell assembly 58 are arranged on the same plane. Space 6 is disposed for securing the insulation between the collectors. While, projecting through hole 5a and through hole 5b serve as guides for alignment in assembling a battery holder. The width of space 6, namely the distance between the cell assemblies, is partially longer than the distance between the cells included in each cell assembly.

In battery block 10, positive-electrode current collector 13 is disposed on the positive side of cells 1, and negative-electrode current collector 15 is disposed on the negative side of cells 1. Positive-electrode current collector 13 is electrically connected to positive electrode terminals of cells 1, and negative-electrode current collector 15 is electrically connected to negative electrode terminals of cells 1.

Between cells 1 and positive-electrode current collector 13, a block holder, reinforcing component 19, and positive electrode lead 21 are disposed. Between cells 1 and negative-electrode current collector 15, the block holder and negative electrode lead 27 are disposed. Cells 1 are bonded to the block holder via adhesive 25.

The block holder disposed on the plus side and minus side in the X direction of cells 1 is formed by integrating first block holder 17 and second block holder 23 to hold the cell assemblies. For integration, uneven shapes can be used. The block holders can be made of insulating resin.

Positive electrode lead 21 electrically connects the positive electrode terminals of cells 1 to positive-electrode current collector 13.

Negative electrode lead 27 electrically connects the negative electrode terminals of cells 1 to negative-electrode current collector 15.

Second metal plate 31 is attached to negative-electrode current collector 15 via insulating plate 29.

Regarding cylindrical cells, by caulking the opening end of an exterior can of each cell, the positive electrode terminal and seal plate are fixed to the exterior can of each cell. Reinforcing components 19 are used for reinforcing the strength of the block holders when gas is released from cells 1. Reinforcing components 19 can be made of glass epoxy resin processed in a sheet shape.

When high-temperature gas is released from cells 1 in the other battery block disposed on second metal plate 31 side, second metal plate 31 is used for reducing the influence of the high-temperature gas on cells 1 included in the concerned battery block.

Positive-electrode current collector 13 and negative-electrode current collector 15 include first connection plate 60 or second connection plate 62. By connecting first connection plate 60 to second connection plate 62, the concerned battery block is electrically connected to the other battery block in series. First connection plate 60 and second connection plate 62 are folded perpendicularly to positive-electrode current collector 13 and negative-electrode current collector 15. First connection plate 60 and second connection plate 62 are disposed on the side surface of battery module 100 that has exhaust duct 48. First connection plate 60 is connected to second connection plate 62 by laser welding, for example.

Second block holder 23 includes support bodies 32. Support bodies 32 are projected toward the outside of second block holder 23. When first connection plate 60 is welded to second connection plate 62, first connection plate 60 is pressurized toward second connection plate 62. Support bodies 32 are disposed so as to be in contact with second connection plate 62, and serve as a support during the pressurization. First connection plate 60 and second connection plate 62 can be disposed in a positional relation in which first connection plate 60 is in contact with support bodies 32.

The block holder includes first projections 33, second projections 35, third projections 37, and fourth projections 39. First projections 33 and fourth projections 39 are disposed in a region in which positive-electrode current collector 13 is disposed. Second projections 35 and third projections 37 are disposed in a region in which negative-electrode current collector 15 is disposed.

First projections 33 are used for integrating reinforcing component 19, positive electrode lead 21, and positive-electrode current collector 13. First projections 33 are passed through the openings disposed in reinforcing component 19, positive electrode lead 21, and positive-electrode current collector 13, and the tips of first projections 33 are thermally molten and welded. The drawings show the state before first projections 33 are thermally welded.

Second projections 35 are used for integrating negative electrode lead 27 and negative-electrode current collector 15. Second projections 35 are passed through the openings disposed in negative electrode lead 27 and negative-electrode current collector 15, and the tips of second projections 35 are thermally welded. In each of insulating plate 29 and second metal plate 31, the places corresponding to second projections 35 are open. The drawings show the state before second projections 35 are thermally welded. After the second projections are thermally welded, negative electrode lead 27 is welded to the negative-side electrodes of cells 1. Due to the thermal melting of the second projections, negative electrode lead 27 can be welded to the negative-side electrodes of cells 1 in the state where negative-electrode current collector 15 is fixed. Negative electrode lead 27 serves as a fuse.

Third projections 37 are used for integrating negative electrode lead 27, negative-electrode current collector 15, insulating plate 29, and second metal plate 31. Third projections 37 are passed through the openings disposed in negative electrode lead 27, negative-electrode current collector 15, insulating plate 29, and second metal plate 31, and the tips of third projections 37 are thermally welded. The drawings show the state before third projections 37 are thermally welded.

The tips of fourth projections 39 are in contact with second metal plate 31 of the other battery block. Fourth projections 39 serve as struts between the concerned battery block and the other battery block. Since fourth projections 39 press the bottom side of cells 1 of the other battery block, the accident is suppressed in which gas is released from cells 1 included in the other battery block and the power of the gas moves cells 1 to the concerned battery block side.

Figure 21:
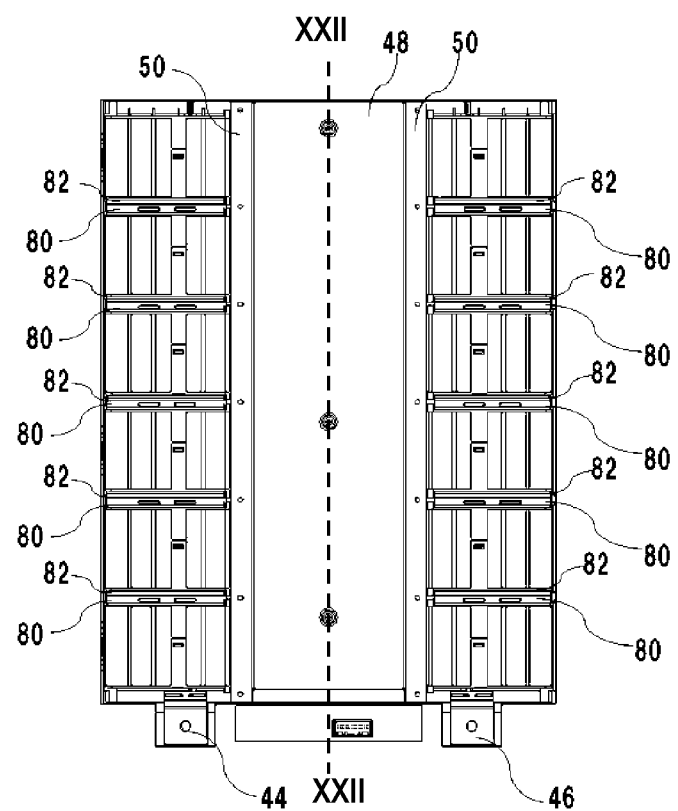
FIG. 21 is a plan view from the Z direction of the battery blocks.
Figure 22:
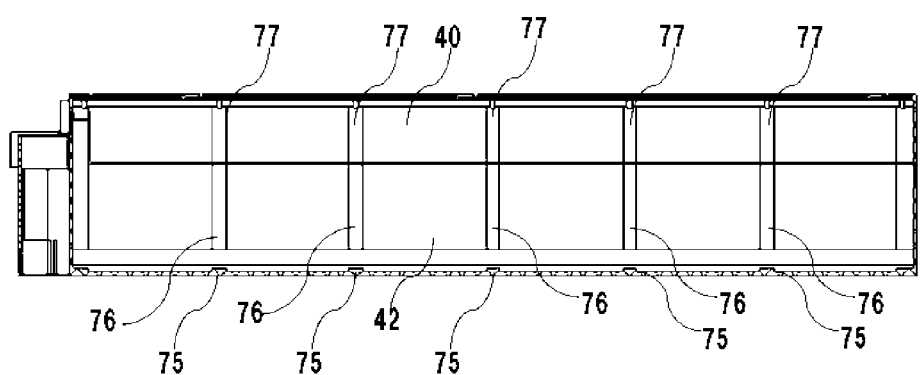
FIG. 22 is a sectional view taken along line XXII-XXII of FIG. 21.
Figure 23:
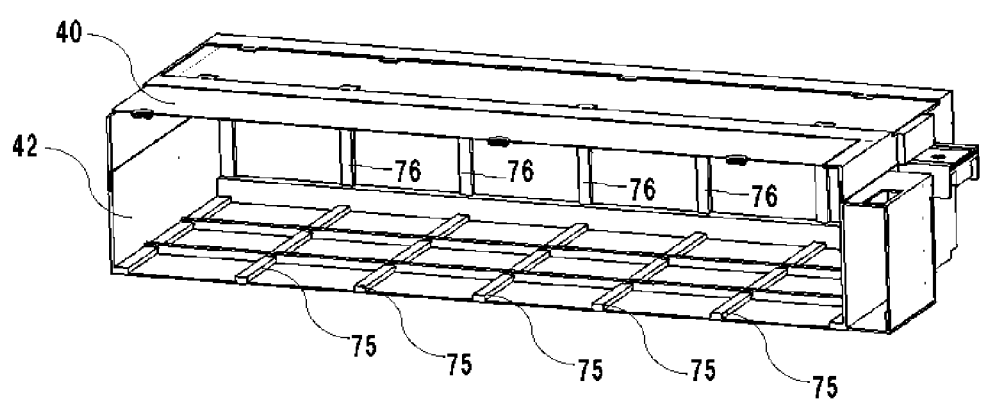
FIG. 23 is a perspective view of the configuration shown in FIG. 22.

FIG. 21 to FIG. 23 illustrate the specific configuration of upper case 40 and lower case 42. In FIG. 21, instead of first connection plate 60 and second connection plate 62, first connection plate 80 and second connection plate 82 are employed. FIG. 22 is a sectional view taken along line XXII-XXII of FIG. 21. FIG. 23 is a perspective view of the configuration shown in FIG. 22.

When high-temperature gas is released from cells 1 of the other battery block into the space formed between the concerned battery block and the other battery block, the influence of the gas must be prevented from causing a hole in a battery case constituting the side surface of the space.

Regarding the side surface of the space on which first connection plate 80 and second connection plate 82 are disposed, by covering the side surface with first connection plate 80 and second connection plate 82, upper case 40 disposed on the side-surface side can be prevented from being directly exposed to the gas. First connection plate 80 and second connection plate 82 are folded perpendicularly to positive-electrode current collector 13 and negative-electrode current collector 15.

Regarding the other side surfaces of the space, the strength against the gas can be secured by adjusting the thicknesses of upper case 40 and lower case 42. First partitions 75 are disposed in upper case 40, and second partitions 76 and third partitions 77 are disposed in lower case 42. First partitions 75, second partitions 76, and third partitions 77 are arranged between the concerned battery block and the other battery block. First partitions 75, second partitions 76, and third partitions 77 are made thicker than the thicknesses of the other parts of the side surfaces of the battery case on which the partitions are disposed, and are formed so as to project to the space side.

Figure 24:
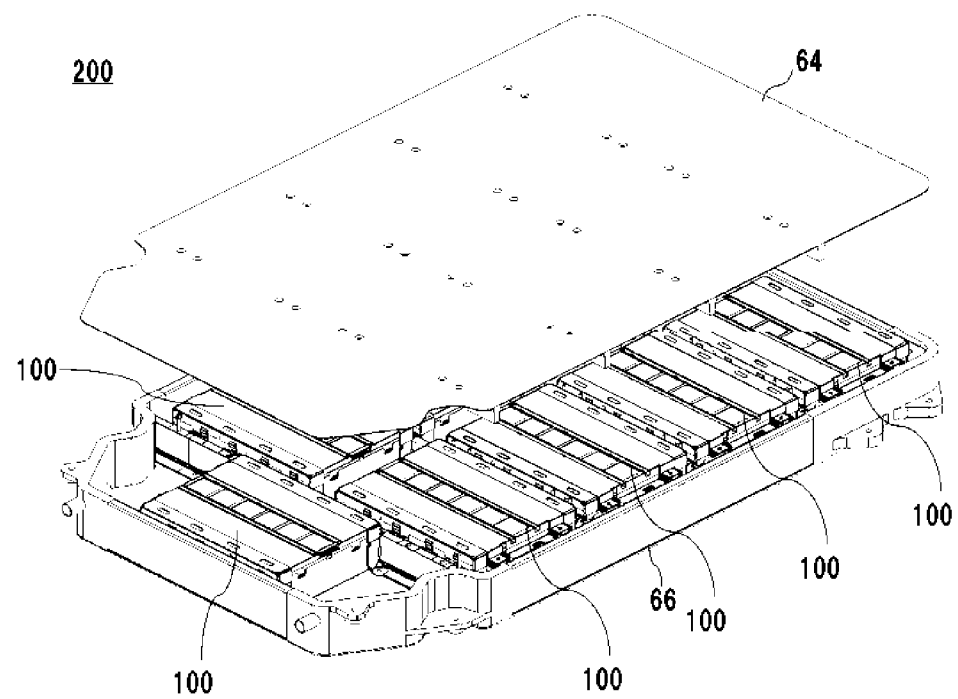
FIG. 24 is an exploded perspective view of a battery pack.
Figure 25:
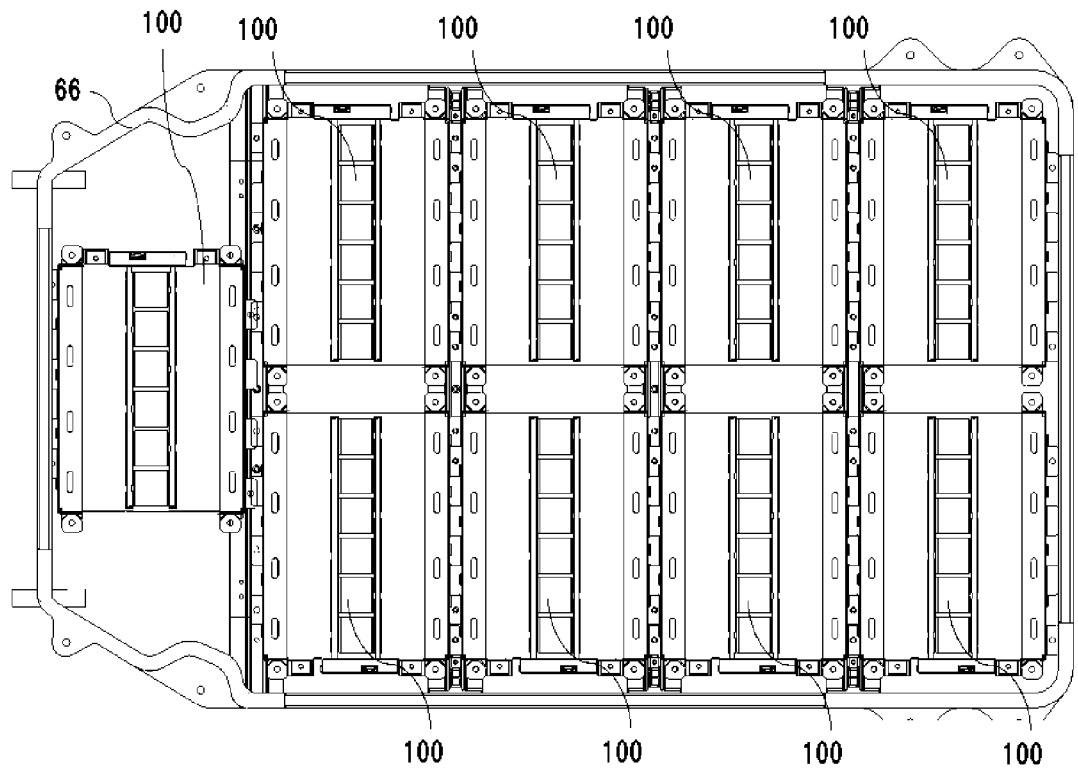
FIG. 25 is a plan view from the Z direction of a plurality of battery modules stored in a housing.
Figure 26:
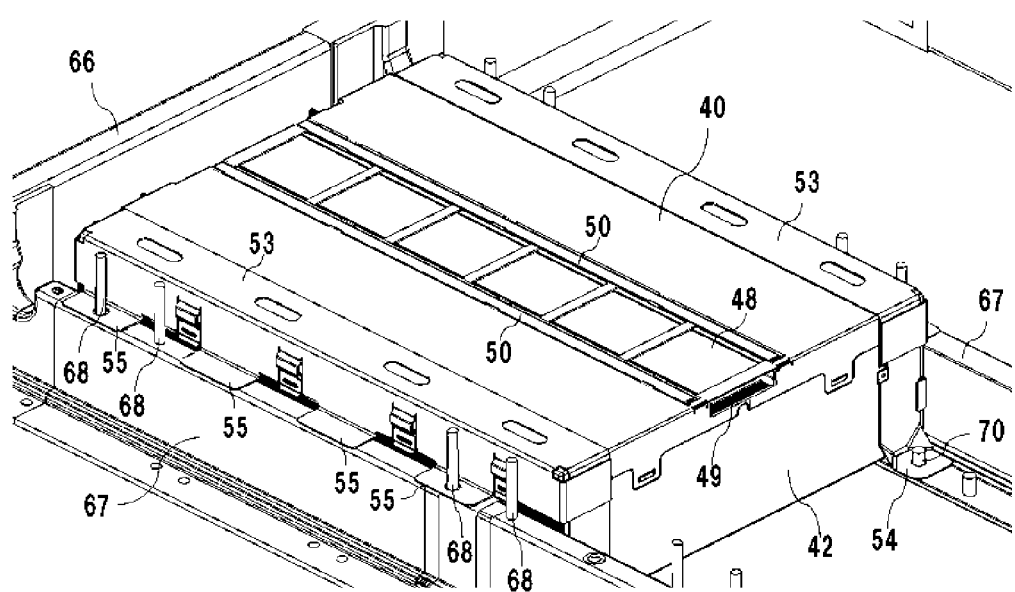
FIG. 26 is a perspective view showing the state where a battery module is attached to the housing.
Figure 27:
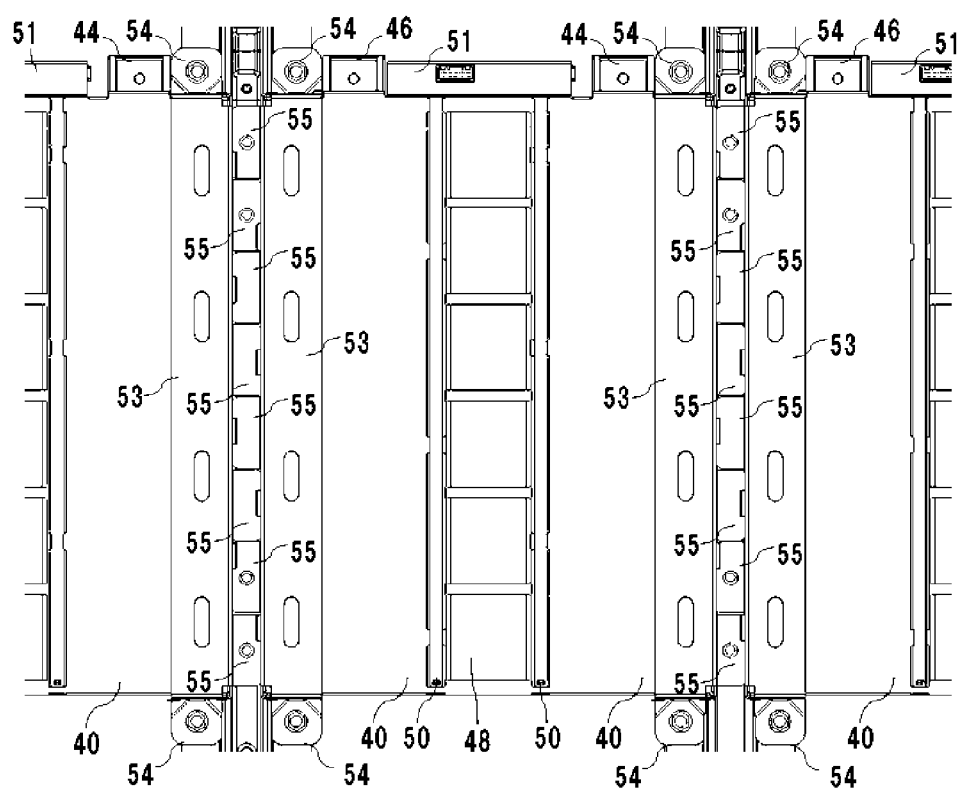
FIG. 27 is a plan view from the Z direction of the state where the plurality of battery modules are attached to the housing.
Figure 28:
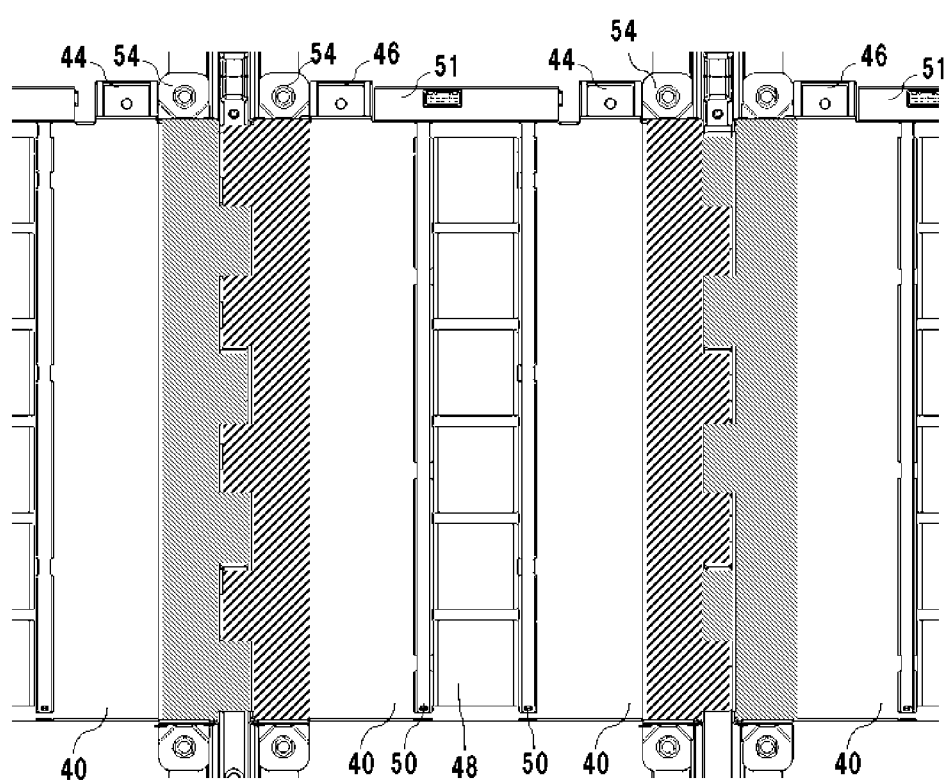
FIG. 28 is a conceptual diagram illustrating a bracket.

FIG. 24 is an exploded perspective view of battery pack 200. FIG. 24 shows lid 64, and the state where a plurality of battery modules 100 are stored in housing 66. FIG. 25 is a plan view from the Z direction of the plurality of battery modules 100 stored in housing 66. FIG. 26 is a perspective view showing the state where battery module 100 is attached to housing 66. FIG. 27 is a plan view from the Z direction of the state where the plurality of battery modules 100 are attached to housing 66. FIG. 28 is a conceptual diagram for illustrating a bracket.

Figure 29:
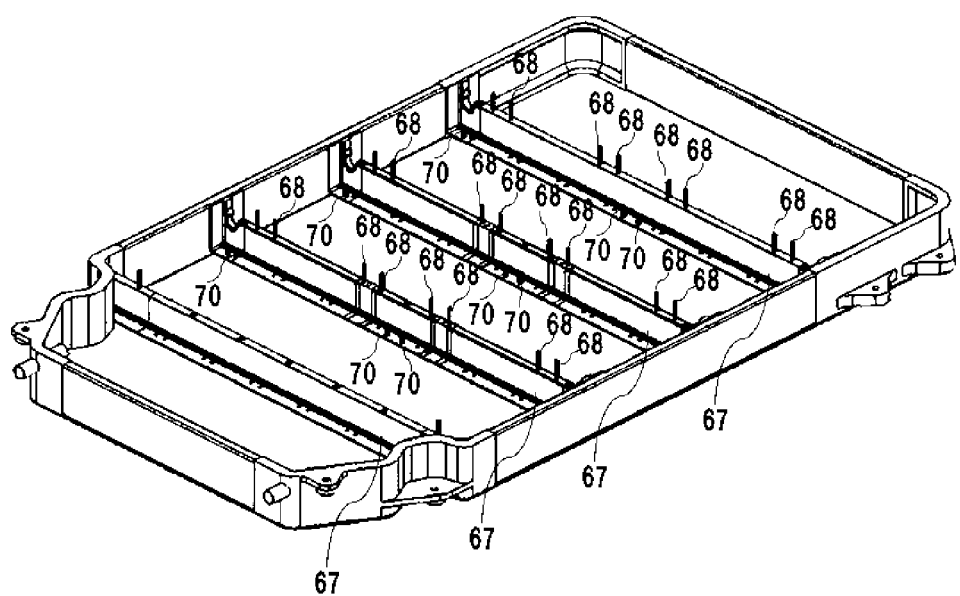
FIG. 29 is a perspective view of the housing.

FIG. 29 is a perspective view of housing 66.

Figure 30:
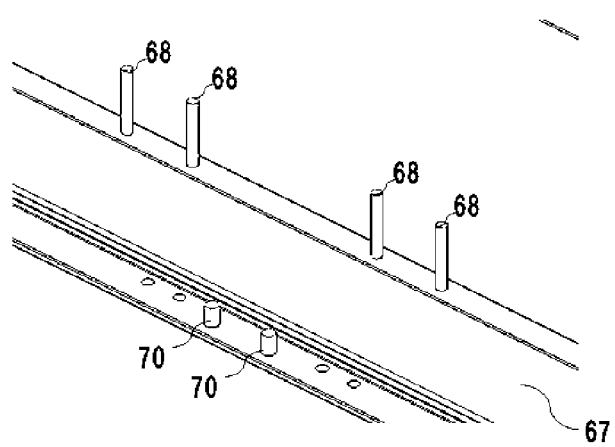
FIG. 30 is a partially enlarged view of the housing.
Figure 31:
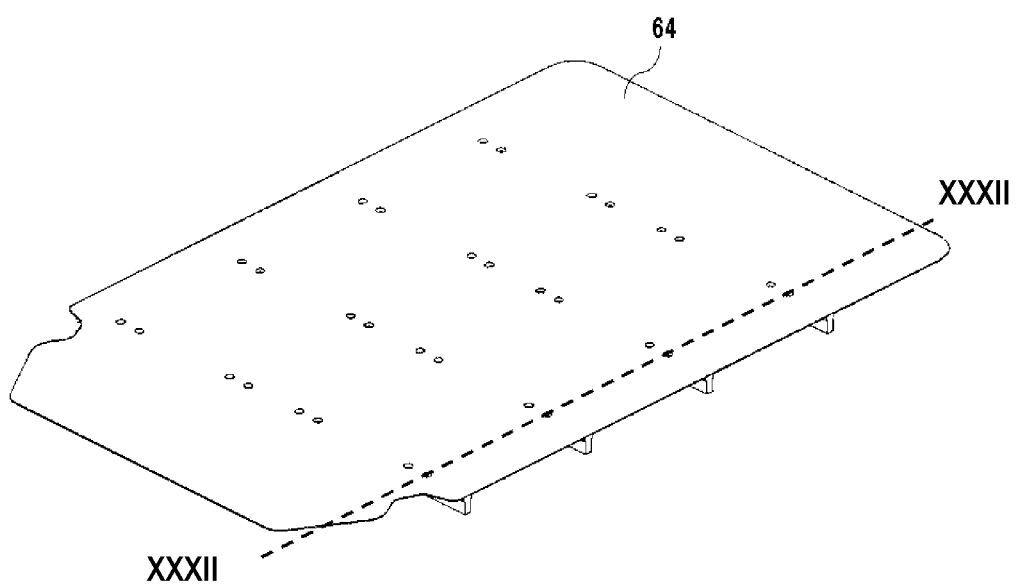
FIG. 31 is a perspective view of a lid.
Figure 32:
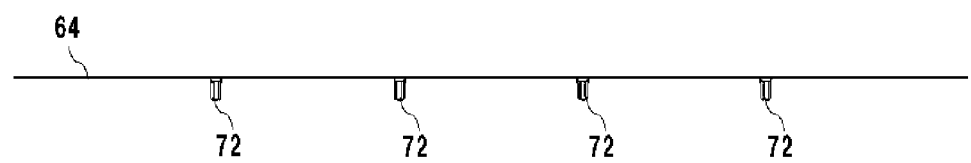
FIG. 32 is a sectional view taken along line XXXII-XXXII of FIG. 31.
Figure 33:
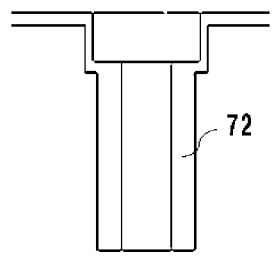
FIG. 33 is a partially enlarged view of FIG. 32.
Figure 34:
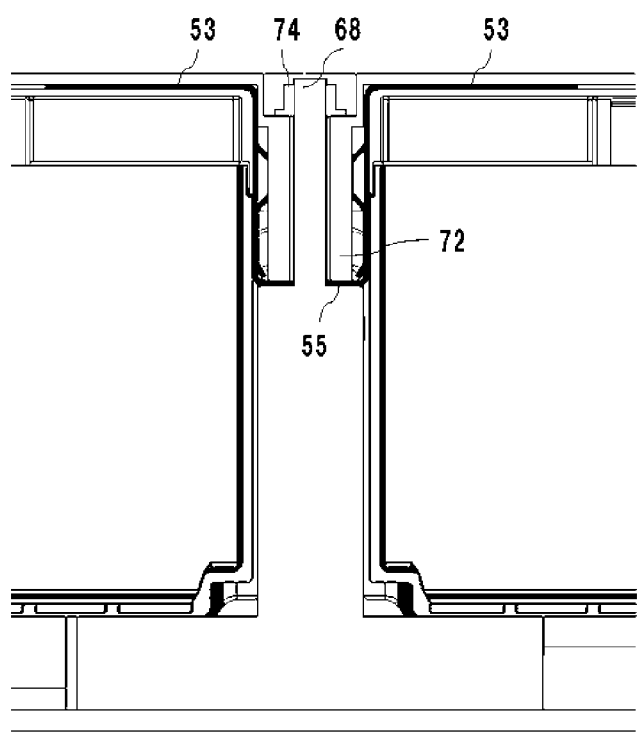
FIG. 34 is a partial sectional view of the inside of the battery pack showing the engagement state between battery modules, the housing, and the lid.

FIG. 30 is a partially enlarged view of housing 66, and is an enlarged view of fifth projections 68 and sixth projections 70. FIG. 31 is a perspective view of lid 64. FIG. 32 is a sectional view taken along line XXXII-XXXII of FIG. 31. FIG. 33 is a partially enlarged view of FIG. 32, and is an enlarged view of engaging portion 72. FIG. 34 is a partial sectional view of the inside of battery pack 200 showing the engagement state between battery modules 100, housing 66, and lid 64.

In a battery case having a wholly rectangular parallelepiped shape, exhaust port 49 is disposed in the surface on the reverse side to the surface having ECU holding unit 51. Thus, the gas released from cells 1 is prevented from affecting the ECU when the gas passes through exhaust duct 48 and is exhausted through exhaust port 49 to the outside of battery module 100. As shown in FIG. 25, in order to prevent the exhausted gas from affecting the ECU of its adjacent battery module, ECU holding unit 51 of one battery module and exhaust port 49 of its adjacent battery module are disposed so as to face the same direction in housing 66.

FIG. 28 is a diagram for illustrating a positional relation when adjacent battery modules are fixed to housing 66. In FIG. 28, shaded areas correspond to brackets 53 of FIG. 27. One bracket 53 is disposed in each shaded area. Each first projecting portion 54 includes a hole. Each sixth projection 70 disposed on the bottom of housing 66 projects through the hole in each first projecting portion 54. Each sixth projection 70 has a thread, and first projecting portion 54 is fixed to the bottom of housing 66 by fastening a nut to sixth projection 70. Second projecting portions 55 are fixed to member 67 of housing 66. Each second projecting portion 55 is processed in an uneven shape. As shown in FIG. 27, adjacent battery modules 100 are attached to member 67 so that second projecting portions 55 of the modules are arranged alternately on member 67. By alternately arranging second projecting portions 55 of the adjacent battery modules, the positions of the adjacent battery modules are regulated by themselves and hence vibration or the like of a car is prevented from moving the battery modules.

Each member 67 includes fifth projections 68 as shown in FIG. 29 and FIG. 30. Each fifth projection 68 projects through a hole disposed in each second projecting portion 55. When lid 64 is put on housing 66, each fifth projection 68 is covered with each engaging portion 72 (see FIG. 32 and FIG. 33) of lid 64. Each engaging portion 72 has a hole through which each fifth projection 68 passes, and has a nut storage portion for storing nut 74. When lid 64 is put on housing 66, as shown in FIG. 34, the tip of fifth projection 68 is projected from engaging portion 72. Fifth projection 68 has a thread, nut 74 is attached to a part of fifth projection 68 that is projected from engaging portion 72, and second projecting portion 55 and lid 64 are fixed to member 67. In engaging portion 72, the inner diameter of the nut storage portion is greater than that of a part for passing only fifth projection 68. As discussed above, lid 64 can be fixed to member 67 (housing 66) via nut 74.

INDUSTRIAL APPLICABILITY

A battery block, battery module, and battery pack of the present disclosure are useful as a power source for driving a motor of an electric car or the like or a backup power source or the like.

The invention claimed is:

1. A battery module comprising a plurality of battery blocks, wherein
each of the plurality of battery blocks includes:
a cell assembly including a plurality of cells;
a block holder for holding the cell assembly; and
a metal plate,
the plurality of cells are held in the block holder while positive electrodes of the plurality of cells are aligned to a first side of the block holder and negative electrodes of the plurality of cells are aligned to a second side of the block holder,
the metal plate is disposed outside the block holder and on a first electrode side, of a positive electrode side and a negative electrode side, of the plurality of cells,
the block holder includes, on a second electrode side of the plurality of cells, a projection projecting toward an outside of the block holder,
the plurality of battery blocks are disposed so as to be adjacent to each other,
the projection of a first battery block of the adjacent battery blocks is disposed so as to face the metal plate of a second battery block, and
a tip of the projection of the first battery block is in contact with the metal plate of the second battery block.

2. The battery module according to claim 1, wherein
the plurality of battery blocks are stored in a battery case,
each of battery blocks included in the plurality of battery blocks includes a positive-electrode current collector and a negative-electrode current collector,
the positive-electrode current collector includes a first connection plate,
the negative-electrode current collector includes a second connection plate,
the first connection plate of the first battery block, of the battery blocks disposed so as to be adjacent to each other, is coupled to the second connection plate of the second battery block, and
the first connection plate and the second connection plate that are coupled to each other partially cover an inner surface of the battery case from an inside of the battery case.

3. The battery module according to claim 2, wherein
the block holder includes a support body projecting toward the outside of the block holder, and
the support body is in contact with the first connection plate or the second connection plate.

4. The battery module according to claim 2, wherein the battery case is formed so that, in an inside of the battery case, a thickness of a part corresponding to a gap between the first battery block and the second battery block is greater than a thickness of a part corresponding to a portion other than the gap.

5. The battery module according to claim 1, wherein
each of the plurality of battery blocks includes a plurality of the cell assemblies,
in each of the plurality of cell assemblies, the plurality of cells are aligned and arranged in a staggered format,
the plurality of cell assemblies are held in the block holder so that longitudinal directions of the plurality of cells are aligned, and
a first cell assembly and a second cell assembly in the plurality of cell assemblies are aligned so that a maximum distance between the first cell assembly and the second cell assembly held in the block holder is longer than a minimum distance between adjacent cells included in each of the first cell assembly and the second cell assembly.

6. The battery module according to claim 5, wherein in a plan view from the longitudinal directions of the plurality of cells, a cell in the first cell assembly included in the plurality of cell assemblies is disposed so as to project toward the second cell assembly adjacent to the first cell assembly.

7. The battery module according to claim 1, wherein
each of battery blocks included in the plurality of battery blocks includes a positive-electrode current collector, and
a reinforcing component is disposed between the plurality of cells and the positive-electrode current collector.

8. A battery pack including the battery module according to claim 1, the battery pack comprising:
a plurality of the battery modules; and
a housing for storing the plurality of battery modules, wherein
each of the plurality of battery modules includes:
    a positive electrode terminal electrically coupled to the positive electrodes of the plurality of cells;
    a negative electrode terminal electrically coupled to the negative electrodes of the plurality of cells; and
    an electronic control unit,
the plurality of battery modules are fixed to a member of the housing via brackets, respectively,
each of the brackets includes projecting portions,
each of the projecting portions is processed in an uneven shape, and
adjacent battery modules, of the plurality of battery modules, are fixed so that the projecting portions of the brackets for fixing the adjacent battery modules are alternately disposed on the member.

9. The battery pack according to claim 8, wherein
the member includes projections,
each of the projecting portions has a hole for passing each of the projections,
a lid including engaging portions is engaged with the housing,
each of the engaging portions is formed so as to project toward each of the projections, and includes a nut storage portion for storing a nut,
the projections are covered with the brackets and the engaging portions via the holes, and the nuts stored in the nut storage portions are attached to the projections, and
in each of the engaging portions, an inner diameter of the nut storage portion is greater than an inner diameter of a part for passing only each of the projections.

* * * * *